US009398195B2

(12) United States Patent
Otake

(10) Patent No.: US 9,398,195 B2
(45) Date of Patent: Jul. 19, 2016

(54) IMAGE PROCESSING INCLUDING COLOR MATERIAL SAVING PROCESS

(71) Applicant: CANON KABUSHIKI KAISHA, Tokyo (JP)

(72) Inventor: Ritsuko Otake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/547,836

(22) Filed: Nov. 19, 2014

(65) Prior Publication Data

US 2015/0172512 A1 Jun. 18, 2015

(30) Foreign Application Priority Data

Dec. 12, 2013 (JP) ................................. 2013-257395

(51) Int. Cl.
*H04N 1/64* (2006.01)
*H04N 1/60* (2006.01)

(52) U.S. Cl.
CPC ............. *H04N 1/644* (2013.01); *H04N 1/6022* (2013.01)

(58) Field of Classification Search
CPC ... H04N 1/6063; H04N 1/644; H04N 1/6022; H04N 2201/325
USPC .......................... 358/1.9, 2.1, 3.1, 3.12, 1.11
See application file for complete search history.

(56) References Cited

U.S. PATENT DOCUMENTS

| | | | |
|---|---|---|---|
| 7,616,360 B2 | 11/2009 | Otake et al. | |
| 7,990,589 B2 | 8/2011 | Otake et al. | |
| 8,077,348 B2 | 12/2011 | Sato et al. | |
| 2004/0095587 A1* | 5/2004 | Brown | H04N 1/40062 358/1.2 |
| 2006/0203277 A1* | 9/2006 | Suzuki | 358/1.14 |
| 2007/0058188 A1* | 3/2007 | Nakahara | H04N 1/6072 358/1.13 |
| 2007/0229872 A1* | 10/2007 | Kanai | 358/1.13 |
| 2009/0213429 A1* | 8/2009 | Miyagi | H04N 1/4051 358/2.1 |
| 2011/0116113 A1* | 5/2011 | Yamada | G06K 15/1825 358/1.9 |

FOREIGN PATENT DOCUMENTS

JP 2011-164489 A 8/2011

* cited by examiner

*Primary Examiner* — Jamares Q Washington
(74) *Attorney, Agent, or Firm* — Fitzpatrick, Cella, Harper & Scinto

(57) ABSTRACT

A function of performing printing with color material usage reduced compared to normal printing is provided. Image data to be printed is analyzed to obtain attribute information of each object. A conversion technique to be applied to each object is determined from a plurality of image data conversion processing techniques for color material usage reduction based on the attribute information of the object. A conversion process is performed using the determined conversion technique. Here, the image data conversion processing techniques include at least a print density reduction process and an image size decrease process.

6 Claims, 13 Drawing Sheets

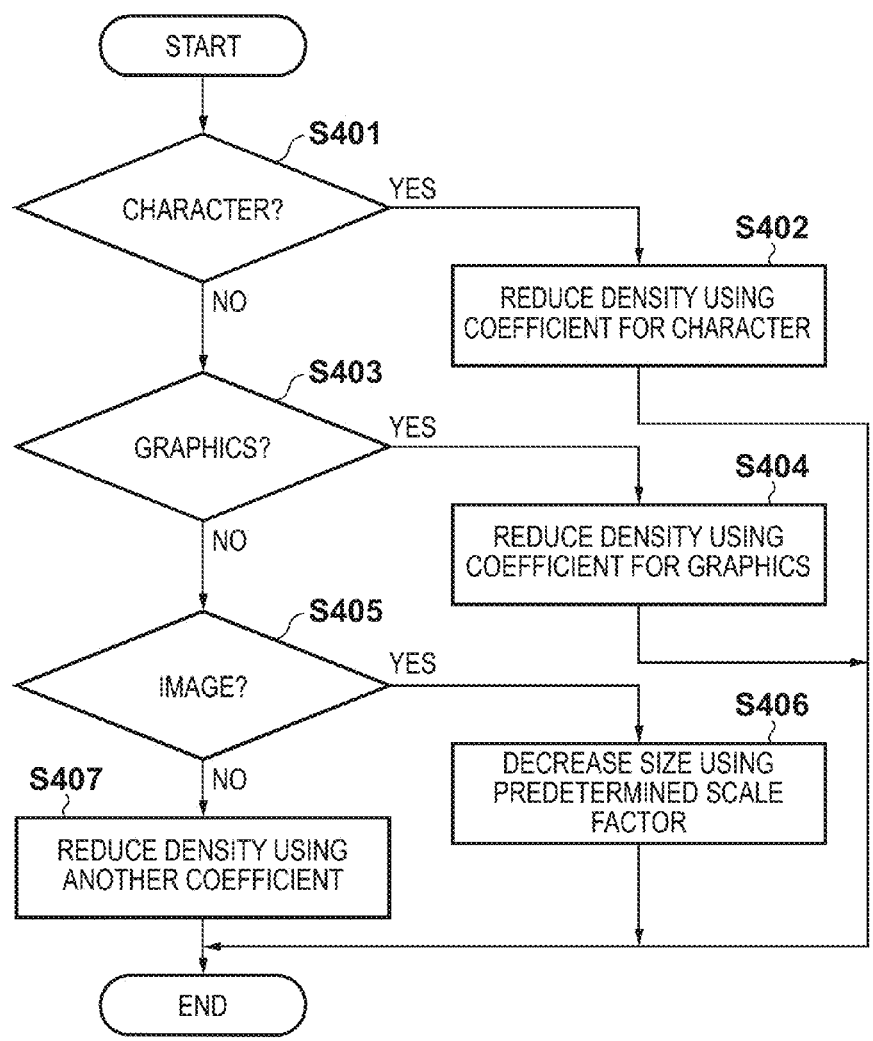

| ATTRIBUTE | REDUCED DENSITY (%) | SIZE DECREASE RATIO (%) |
|---|---|---|
| CHARACTER | Dtxt | Stxt |
| GRAPHICS | Dgph | Sgph |
| IMAGE | Dimg | Simg |
| OTHERS | Detc | Setc |

| ATTRIBUTE | REDUCED DENSITY (%) | SIZE DECREASE RATIO (%) |
|---|---|---|
| CHARACTER | 50 | 75 |
| GRAPHICS | 35 | 50 |
| IMAGE | 70 | 50 |
| OTHERS | 50 | 75 |

FIG. 16
660
ADJUSTMENT OF TONER SAVING LEVEL
1. PRINT ADJUSTMENT SHEET
2. SELECT ACCEPTABLE IMAGES FROM PRINTED IMAGES
VIEW PRINTED SAMPLES, AND SPECIFY THE NUMBERS
OF ACCEPTABLE IMAGES IN EACH OF THE IMAGES A AND B
IMAGE A 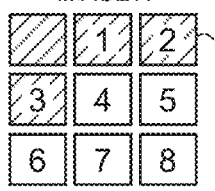 661
IMAGE B 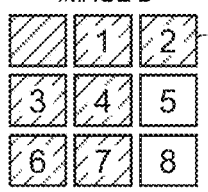 662
CANCEL 663  OK 664

IMAGE PROCESSING INCLUDING COLOR MATERIAL SAVING PROCESS

BACKGROUND OF THE INVENTION

1. Field of the Invention

The present invention relates to image processing apparatuses, image processing methods, and medium storing therein a program for performing image processing. More particularly, the present invention relates to an image processing apparatus, image processing method, and program for performing image processing which can reduce color material usage.

2. Description of the Related Art

The amount of color material which is used (hereinafter referred to as color material usage) during printing may be reduced by using a technique of reducing print density. An example of such a technique is described in Japanese Patent Laid-Open No. 2011-164489. Specifically, a plurality of image processing techniques for reducing color material usage are provided. Preview images are presented which have been treated by the color material usage reduction processes for achieving a predetermined reduction rate. The user selects a processing technique while viewing the preview screen.

However, in Japanese Patent Laid-Open No. 2011-164489, it is necessary to provide preview images which have been treated by a plurality of color material usage reduction processes, and cause the user to view the preview screen and select a desired color material usage reduction process. Therefore, it takes time and effort for the user to perform such selection.

SUMMARY OF THE INVENTION

According to one aspect of the present invention, there is provided an image processing apparatus comprising: an attribute determination unit which determines an attribute of an object contained in print data; and a processing unit which, if the processing unit is instructed to perform a color material saving process and the attribute determination unit determines that the print data contains an image object, decreases the size of the image object contained in the print data, and if the processing unit is instructed to perform the color material saving process and the attribute determination unit determines that the print data contains a character object, reduces the density of the character object contained in the print data.

According to the present invention, a suitable color material reduction process can be applied to each object contained in image data to be printed, depending on the type of the object.

Further features of the present invention will become apparent from the following description of exemplary embodiments with reference to the attached drawings.

BRIEF DESCRIPTION OF THE DRAWINGS

FIG. 4 is a flowchart showing a process of a first embodiment.

FIG. 16 is a diagram showing a level adjustment operation screen.

DESCRIPTION OF THE EMBODIMENTS

Embodiments for carrying out the present invention will now be described with reference to the accompanying drawings.

[First Embodiment]

Firstly, a configuration of a system to which this embodiment is preferably applied will be described with reference to FIGS. 1 to 3.

<Configurations of Image Processing System and Apparatus>

Figure 1:
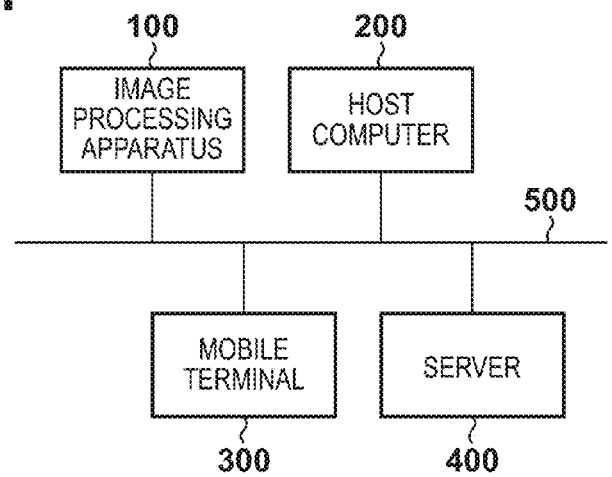
FIG. 1 is a diagram showing a system configuration.

FIG. 1 shows a system configuration to which this embodiment is preferably applied. An image processing apparatus 100, a host computer 200, a mobile terminal 300 and a server 400 are connected together through a network line 500. The image processing apparatus 100 performs image processing on input image data and outputs the resultant image data. The host computer 200 instructs the image processing apparatus 100 to perform printing, and preforms image processing in accordance with an application.

The image processing apparatus 100 is, for example, an apparatus which has both an image processing function and an image forming function, such as a digital multifunction peripheral, a digital single-function printer, etc. The image processing apparatus 100 has a function of processing image data and printing the resulting image data, in accordance with an instruction from the host computer 200, the mobile terminal 300, or the server 400 through the network line 500. The image processing apparatus 100 may also have a function of reading an original document using an image reading apparatus (not shown) to generate image data, processing the image data, and sending the resultant image data to the host computer 200, the mobile terminal 300, or the server 400. The image processing apparatus 100 may also have a copying function of reading an original document to generate image data, processing the image data, and printing the resultant image data.

In this embodiment, it is assumed that the image processing apparatus 100 performs printing in accordance with an instruction received from the host computer 200, the mobile terminal 300, or the server 400. The present invention is not limited to this. The present invention is similarly applicable to the case where the copying function is performed, i.e., the image processing apparatus 100 operates alone.

Figure 2:
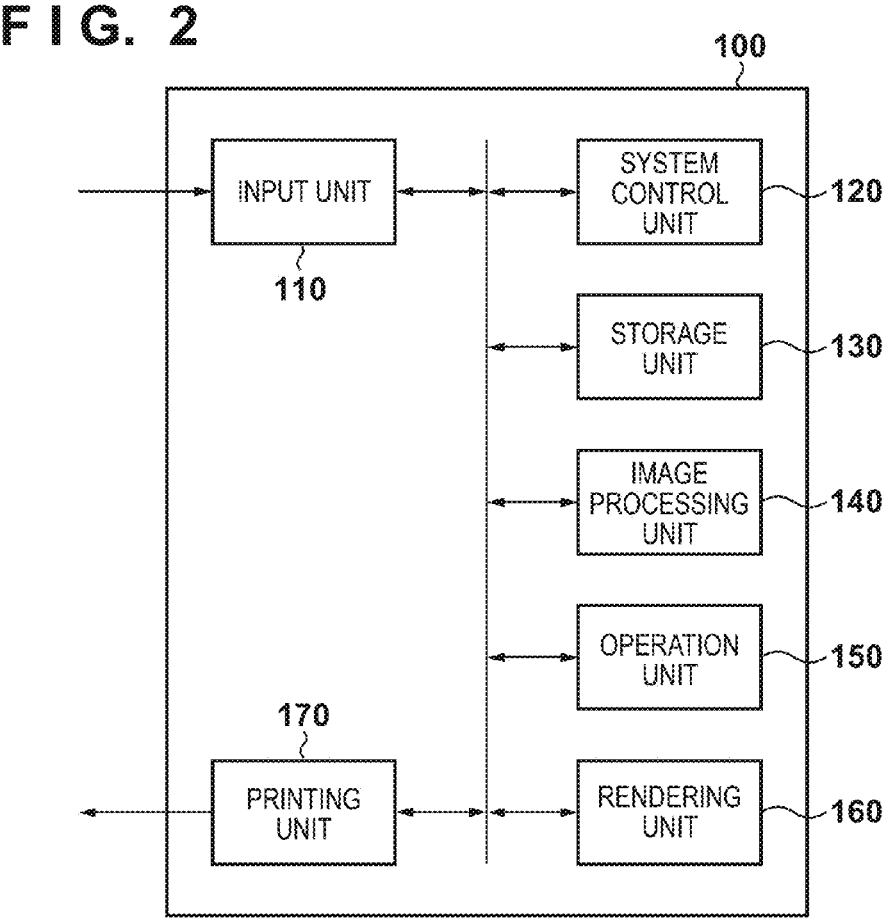
FIG. 2 is a diagram showing a configuration of an image processing apparatus.

FIG. 2 shows an internal configuration of the image processing apparatus 100. An input unit 110 receives various items of data sent from an external apparatus, and in addition, receives image data which is generated by an image reading apparatus (not shown) reading an original document. A system control unit 120 functions as a controller which controls the entire image processing apparatus 100. A storage unit 130 stores image data and information associated with the image data. The storage unit 130 includes a system work memory for operating the system control unit 120, etc. An image processing unit 140 performs, on image data, correction, processing, editing, and a conversion process for outputting. An operation unit 150 is an apparatus which allows the user to perform various operations using an operation screen, an operation button, etc. (not shown). The operation unit 150 notifies the system control unit 120 of information specified by the operation. A rendering unit 160 interprets input data described in a page description language (hereinafter referred to as PDL data) to reconstruct image data to be output. Note that the rendering unit 160 will be described in detail below with reference to FIG. 3. A printing unit 170 forms and outputs an image on paper based on image data which has been converted into print data. Examples of this printing technique include electrophotography, inkjet printing, etc. In this embodiment, any printing technique that uses color material for printing may be employed.

Figure 3:
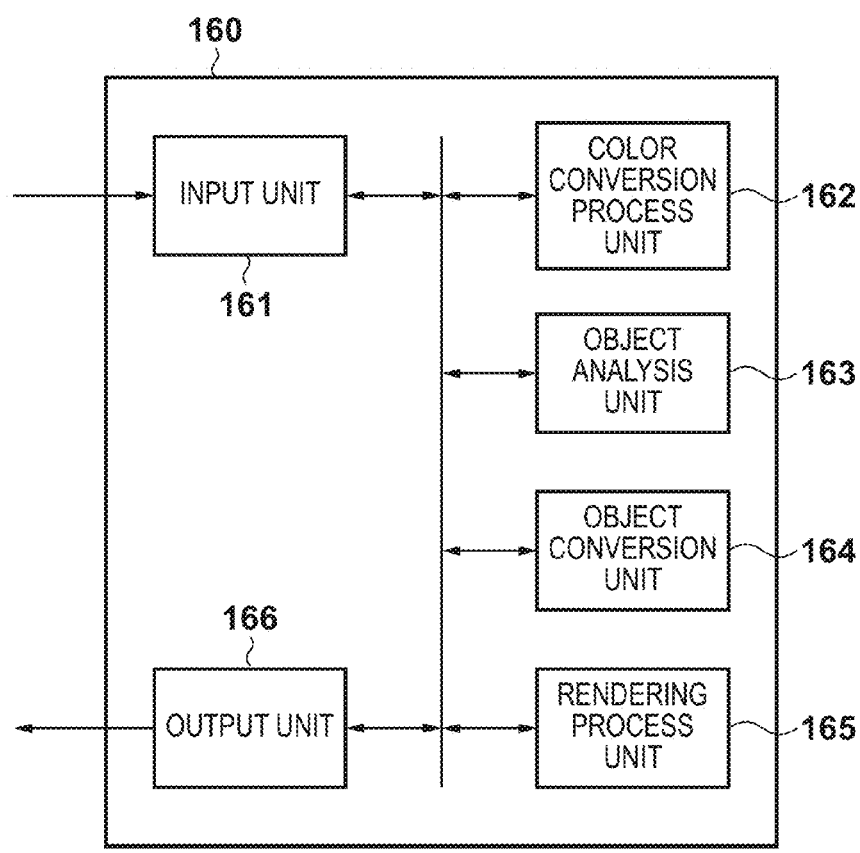
FIG. 3 is a diagram showing a configuration of a rendering unit.

FIG. 3 shows an internal configuration of the rendering unit 160. An input unit 161 receives PDL data input to the image processing apparatus 100. A color conversion process unit 162 converts image data in the PDL data into a predetermined color space, e.g., the YMCK (Yellow, Magenta, Cyan, black) color space. An object analysis unit 163 obtains attribute information indicating the type (e.g., characters, image, graphics, etc.) of each object in the PDL data. The attribute information is described for each object. Moreover, the area ratio of an object of interest to one page, the number of gradation levels (or a color depth), the average value of signal values, the value of variance, the proportion of an edge region, etc., are analyzed to generate property information required in the subsequent process. An object conversion unit 164 performs an image conversion process on each object based on the result of the analysis performed by the object analysis unit 163. Examples of this conversion process include a color-to-grayscale conversion process of converting a color image into a grayscale image, a density conversion process for adjusting the output density, an enlargement/reduction process, etc. The present invention is not limited to these conversion processes. Another color material usage reduction process, such as a process of changing the output density between an edge region and the other region in order to reduce color material usage, etc., may be used. A rendering process unit 165 converts image data into an output format. An output unit 166 outputs the image data which has been converted into the output format.

<Color Material Usage Reduction Process>

Next, a basic process flow of this embodiment will be described. FIG. 4 is a flowchart showing a flow of a color material usage reduction process which is performed on an object by the object analysis unit 163 and the object conversion unit 164 in the rendering unit 160 when PDL data is rendered. The process of FIG. 4 is performed on all objects to be processed.

If, in step S401, the object analysis unit 163 determines that the attribute of an object to be processed is a character, the object conversion unit 164 performs a density reduction process to achieve a predetermined reduced density (%) for a character in step S402. If, in step S403, the object analysis unit 163 determines that the attribute of the object to be processed is graphics, the object conversion unit 164 performs a density reduction process to achieve a predetermined reduced density (%) for graphics in step S404. Here, the predetermined reduced density (%) may be previously determined for each object type or may be specified by the user as appropriate. For example, the predetermined reduced density (%) for a character is 80% of the original density, and the predetermined reduced density (%) for graphics is 70% of the original density, etc. If, in step S405, the object analysis unit 163 determines that the attribute of the object to be processed is image, the object conversion unit 164 decreases the size of the object by a predetermined scale factor, e.g., 70%, in step S406. If the attribute of the object to be processed is none of character, image, and graphics, the object conversion unit 164 performs a density reduction process to achieve a predetermined reduced density (e.g., 70% of the original density) in step S407. Note that the "predetermined" value may only need to be determined before the process is performed, and does not necessarily mean a fixed value, and may be specified by the user.

The above process is performed on all objects in the PDL data input to the rendering unit 160, and image data which has been converted into a format for printing in the rendering process unit 165 and the output unit 166 is sent to the printing unit 170. The printing unit 170 prints the received image data which has been treated by the color material usage reduction processes. The image data to be printed may be either color image data or monochromatic image data. Thus, the different color material usage reduction processes are performed for different attributes of objects in PDL data, whereby a printed output can be obtained in which the color material usage is reduced while the legibility of characters or the gradation quality of photographs is maintained.

Figure 5A:
FIGS. 5A-5E are diagrams showing processed images.
Figure 5B:

FIGS. 5A-5E show images which have been treated by the processes of this embodiment. FIG. 5A shows an original image which has not been treated by a color material usage reduction process. FIG. 5A may be either a color image or a monochromatic image. In the figure, characters in the middle are dealt with as an object whose attribute is character, an upper left photograph is dealt with as an object whose attribute is image, and a lower left illustration is dealt with as an object whose attribute is graphics. FIG. 5B shows the result of the process of the flowchart of FIG. 4, in which the predetermined density reduction process has been performed on characters and graphics, and the size decrease process has been performed on images using a predetermined reduction ratio.

As described above, by applying a density reduction process corresponding to the type of an object, information which can be obtained from an original image can be obtained from an image which has been treated by a density reduction process while reducing the amount of color material, such as toner, ink, etc., that is used. Note that the color material usage reduction process may not be performed unconditionally, and may be performed in accordance with an instruction to perform the color material usage reduction process if the instruction is received from the operation unit 150 or an external apparatus, such as the host computer 200, etc.

<Variation of First Embodiment>

If a plurality of processing techniques, e.g., the density reduction process and the size decrease process, are available for the color material usage reduction process, a means for allowing the user to simply specify the processing technique can be provided.

Figure 6:
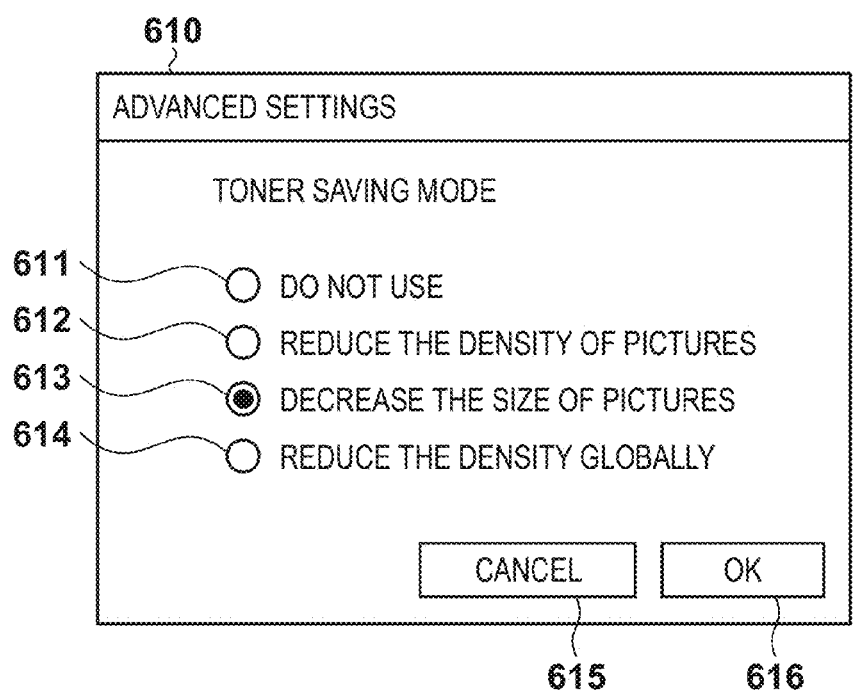
FIG. 6 is a diagram showing an operation screen for setting a processing mode.

FIG. 6 shows an example operation screen displayed on the operation unit 150 for specifying settings for the color material usage reduction process. Specifically, this operation screen is a color material usage reduction mode (toner saving mode) selection screen 610 for allowing the user to specify a portion of different processing techniques determined for different object attributes. The user interface 610 is displayed by pressing down an advanced setting button, etc., previously provided on the basic screen for printing. For example, radio buttons 611 to 614 are a set of buttons, only one of which is effective at any time. By the user pressing down a button corresponding to an item which the user causes to be effective, the buttons can be changed. When the user selects a mode in which the color material usage reduction process is not performed, the user selects the radio button 611. When the user selects a mode in which the density of a picture, such as an image, graphics, etc., is reduced in order to reduce the color material usage, the user selects the radio button 612. When the user selects a mode in which the color material usage is reduced by decreasing the size of a picture, such as an image, graphics, etc., the user selects the radio button 613. When the user selects a mode in which the color material usage is reduced by reducing the density globally irrespective of the object attribute, the user selects the radio button 614. When a cancel button 615 is pressed down, the settings of the screen 610 are cancelled, and the screen 610 is turned off, and the previous settings immediately before the screen 610 is displayed are caused to be effective. When an OK button 616 is pressed down, the settings on the screen 610 are caused to be effective, and the screen 610 is turned off. By providing such an operation means such as the user interface 610, the user can change color material usage reduction techniques, depending on a document to be printed or intended use. For example, even when default settings are given so that a size of an image object is decreased as shown in FIG. 4, the above operation means can be used to specify and perform a process of reducing the color material usage by reducing the density instead of the size decreasing process.

Figure 17:
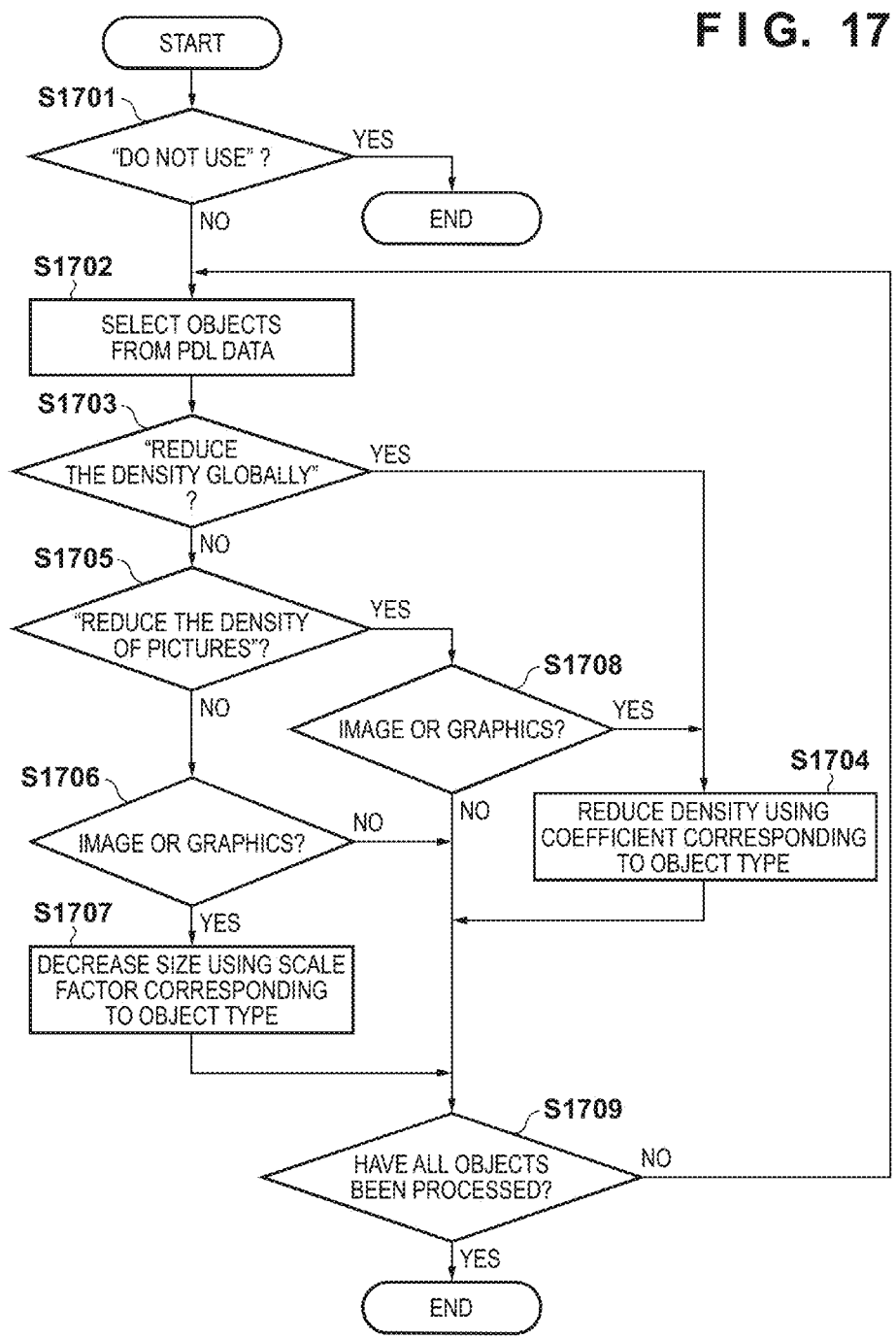
FIG. 17 is a flowchart showing a process of a variation of the first embodiment.

The color material usage reduction mode set by the user interface of FIG. 6 is, for example, stored as setting information, such as a flag, corresponding to the selected option. The color material usage reduction process which uses the setting information will be described with reference to a flowchart of FIG. 17. The flow of FIG. 17 is performed by the image processing apparatus 100 using PDL data which forms a single print job.

Initially, in step S1701, it is determined whether or not the information forming apparatus 100 is in a non-reduction mode, i.e., the color material usage reduction process is not used ("DO NOT USE"), and if the result of the determination is positive, the color material usage reduction process is ended. If the result of the determination in step S1701 is negative, an object to be processed is selected from the PDL data in step S1702. Next, in step S1703, it is determined whether or not the information forming apparatus 100 is in a global density reduction mode, i.e., the density is to be globally reduced ("REDUCE THE DENSITY GLOBALLY"), and if the result of the determination is positive, the density reduction process is performed using a coefficient corresponding to the type of an object to be processed in step S1704. On the other hand, if the result of the determination in step S1703 is negative, it is determined whether or not the information forming apparatus 100 is in a non-character density reduction mode, i.e., the density of a picture is to be reduced ("REDUCE THE DENSITY OF PICTURES") in step S1705. If the result of the determination in step S1705 is positive, it is determined whether or not an object to be processed is an image or graphics in step S1708. If the result of the determination in step S1708 is positive, the density of the object is to be reduced, and therefore, the density reduction process is performed in step S1704. If the result of the determination in step S1705 is negative, it is determined that the image forming apparatus 100 is in a non-character size decrease mode, i.e., the size of pictures is decreased ("DECREASE THE SIZE OF PICTURES"), and in step S1706, it is determined whether or not the object to be processed is an image or graphics. If the result of the determination in step S1706 is positive, the size of the object is to be decreased, and in step S1707, the size of the object is decreased by a scale factor corresponding to the type of the object. After the density reduction process or the size decrease process has been completed, it is determined whether or not all objects to be processed in the PDL data have been processed in step S1709. If the result of the determination in step S1709 is positive, the process is ended. Otherwise, control returns to step S1702, in which the next object is selected.

Figure 5C:
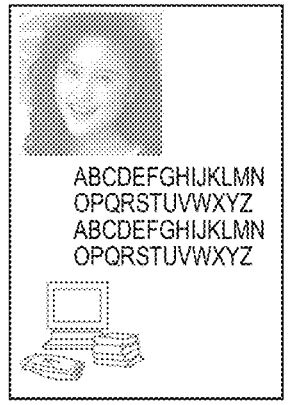
Figure 5D:
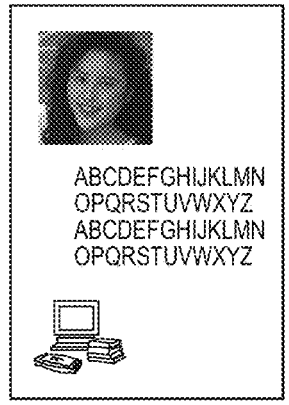
Figure 5E:
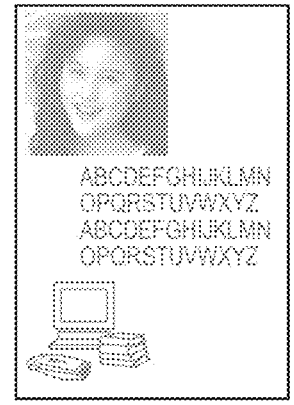

FIGS. 5C-5E show images processed using the above different processing modes. FIG. 5C shows an example in which the color material usage is reduced only by the density reduction process without reducing the size of images and graphics, i.e., a processed image obtained when the user selects the radio button 612 which is the option "REDUCE THE DENSITY OF PICTURES." Because the size decrease process is not performed, the color material usage can be reduced without changing the layout in the page. FIG. 5D shows a processed image obtained when the user selects the radio button 613 which is the option "DECREASE THE SIZE OF PICTURES," i.e., the result of color material usage reduction by the size decrease process while maintaining the density of original images and graphics. This processing technique does not reduce the density of photographs and illustrations, and therefore, is particularly effective for images for which the impairment of gradation quality is not preferable. FIG. 5E shows a processed image obtained when the user selects the radio button 614 which is the option "REDUCE THE DENSITY GLOBALLY," i.e., the result of color material usage reduction by the density reduction process performed on all objects without performing the size decrease process.

As described above, by changing processing techniques or process coefficients, depending on the attribute of each object, a color material usage reduction process can be performed while legibility and gradation quality required for printed documents are suitably maintained. By allowing the user to specify a portion of rules to change processing techniques, a suitable process can be easily provided, depending on the intended use of a printed document or the user's preference.

[Second Embodiment]

In the first embodiment, the method of changing schemes or coefficients of the color material usage reduction process, depending on the object attribute, has been described. In this embodiment, in addition to this, a method of changing schemes or coefficients of the color material usage reduction process, using both attribute information and information indicating properties of an object which are obtained by calculating a feature amount of each object as properties of an image will be described. Note that details common to the first and second embodiments will not be described.

Figure 7:
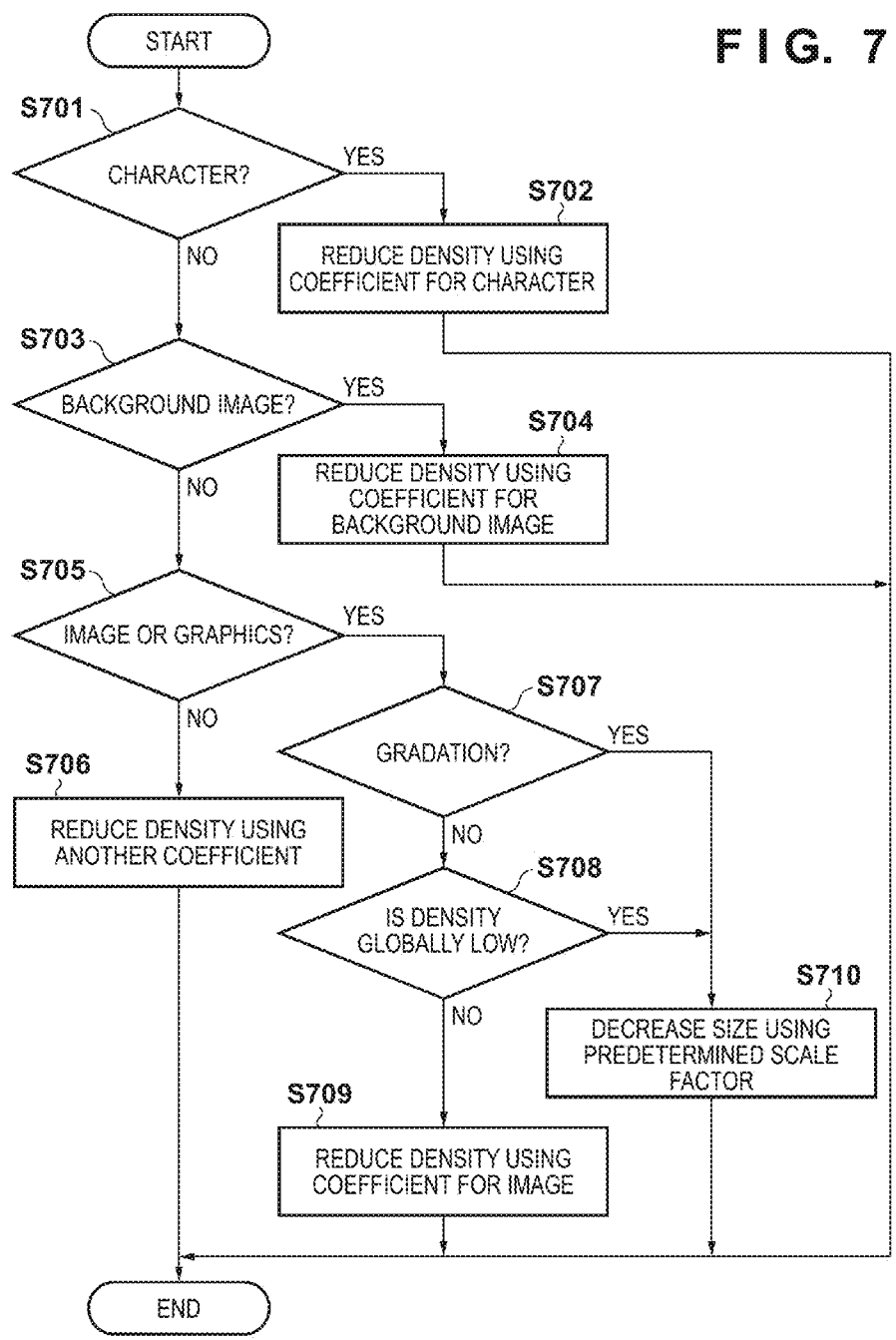
FIG. 7 is a flowchart showing a process of a second embodiment.

FIG. 7 is a flowchart showing a flow of a color material usage reduction process which is performed on an object by the object analysis unit 163 and the object conversion unit 164 in the rendering unit 160 when PDL data is rendered. The process of FIG. 7 is performed on each of objects to be processed.

If, in step S701, the object analysis unit 163 determines that the attribute of an object to be processed is character, the object conversion unit 164 performs the density reduction process on the density of the object using a predetermined coefficient for character in step S702. If, in step S703, the object analysis unit 163 determines that the object to be processed is a background image, i.e., an image which is added to the background of each page and is common to pages, and therefore, does not have a very large amount of information, control proceeds to step S704. The background image can also be identified using an attribute value indicating a background image object. Alternatively, if the proportion of the area which is occupied by a graphics object to one page is greater than or equal to a predetermined value, it may be determined that the object is background. In step S704, the object conversion unit 164 performs the density reduction process by multiplying a predetermined coefficient (e.g., 50% of the original object) for reducing the background image. If, in step S705, the object analysis unit 163 determines that the attribute of the object to be processed is not image or graphics, the object conversion unit 164 performs the density reduction process to achieve a predetermined reduced density in step S706. If the attribute is image or graphics, the object analysis unit 163 determines whether or not the number of gradation levels of the object to be processed is greater than or equal to a reference in step S707, and determines whether or not an average density value of the object to be processed is smaller than or equal to a reference in step S708. If the number of gradation levels is greater than or equal to the reference or the average density value is smaller than or equal to the reference, the object conversion unit 164 decreases the size of the object to be processed using a predetermined scale factor in step S710. This is because the object to be processed is presumed to be an image for which color and density are more important than size. If none of the gradation and density meets the above conditions, the object conversion unit 164 performs the density reduction process to achieve a reduced density for images in step S709.

By performing the above process on each object, a process scheme and process coefficient suitable for each object can be selected from various process schemes for reducing the color material usage. As a result, inappropriate processes can be reduced or avoided, such as loss of information due to density conversion performed though the gradation quality of an object is important, loss of legibility due to an excessive decrease in the size of small characters, etc. Here, for the sake of simplicity, it is assumed that branch conditions, density reduction ratios, and scale factors have predetermined values. The present invention is not limited to this. A technique of determining conditions or process coefficients more finely may be used. Although the number of gradation levels has been described as properties of an object, property information may be produced based on the result of an edge component extraction process, a frequency analysis process, etc., and the process may be branched according to the property information.

Figure 8A:
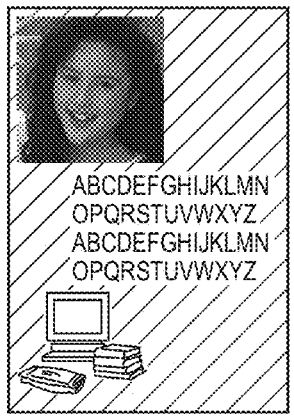
FIGS. 8A-8C are diagrams showing processed images.
Figure 8B:
Figure 8C:
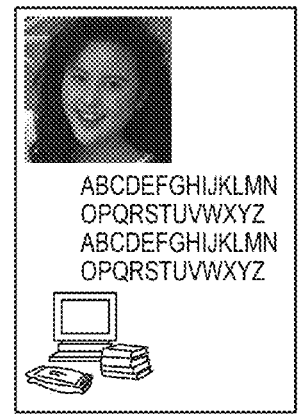

FIGS. 8A-8C show images which have been treated by the process of this embodiment. FIG. 8A shows an image which has not been treated by the color material usage reduction process. FIG. 8B shows an image in which the density of hatching on background which is determined to be a background image is reduced, a size of a photograph which is a gradation image is decreased, and the density of an illustration portion which is graphics, which does not require high gradation quality, is reduced. Also, by changing each process coefficient, an object in which the reduced density of the background image is reduced to 0%, i.e., the background image is erased while the other portions are not converted, can be obtained as shown in FIG. 8C.

<Variation of Second Embodiment>

Figure 9:
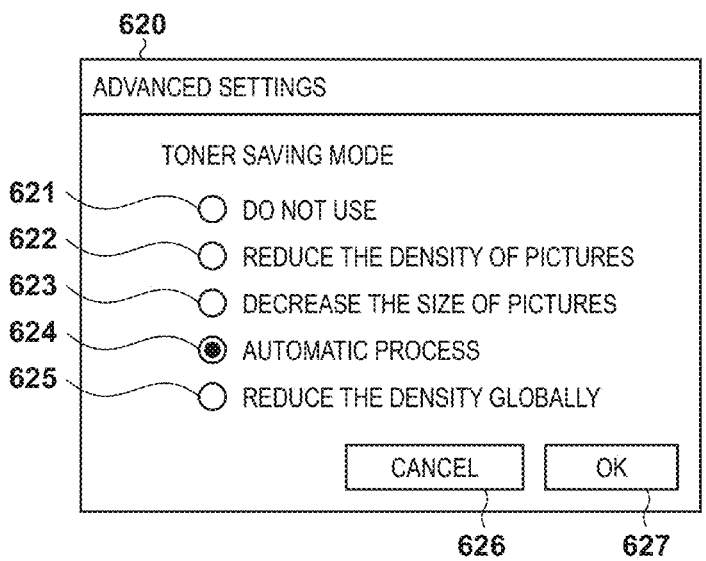
FIG. 9 is a diagram showing an operation screen for setting a processing mode.

FIG. 9 shows an operation screen 620 which is used to select a color material usage reduction processing mode in this embodiment. The difference from the operation screen of FIG. 6 is that a radio button 624 which is an option "AUTOMATIC PROCESS" is added to the items which can selected using radio buttons. When settings associated with the radio button 624 are caused to be effective by the user pressing down the radio button 624, property data is obtained for each object by image analysis as described above, and based on the property data, a process scheme or a process coefficient is determined. A process which is performed when the mode of FIG. 9 is used, will be described with reference to FIG. 17. The difference from the variation of the first embodiment is a process which is performed when the result of the determination in step S1705 is negative ("NO"). If the determination result in step S1705 is negative, in this embodiment it is determined whether or not the image forming apparatus 100 is in the non-character density reduction mode, i.e., the size of a picture is decreased ("DECREASE THE SIZE OF PICTURES"). If the result of the determination is positive, control proceeds to step S1706. Otherwise, it is determined that the image forming apparatus 100 is in an automatic determination mode, i.e., the process is automatically performed ("AUTOMATIC PROCESS"), and the process of FIG. 7 is called. After the process of FIG. 7 has been completed, control returns to step S1709.

As described above, the color material usage reduction process is controlled using image property information, such as the number of gradation levels, the density, the amount of edge components, etc., in addition to the attribute information of each object, whereby a process more suitable for a document to be printed can be performed. As a result, an appropriate process can be achieved for obtaining printed matter having excellent legibility and gradation quality while reducing the color material usage without requiring the user to perform a complicated setting operation.

[Third Embodiment]

In this embodiment, a method of performing the process of decreasing the size of each object and the process of reducing the density in combination for color material usage reduction, will be described. Note that details common to the first or second and third embodiments will not be described.

Figures 10, 11A, 11B:
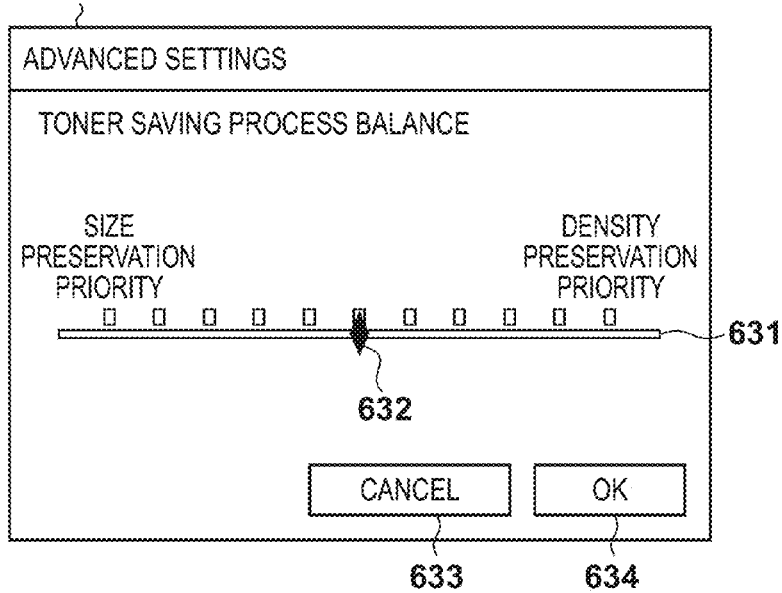
FIG. 10 is a diagram showing an operation screen for setting weights of processing schemes.
FIGS. 11A and 11B are diagrams showing process coefficients for each attribute.

FIG. 10 shows a toner saving process balance setting screen 630 for allowing the user to specify a priority level indicating which of the density reduction process and the size decrease process is given priority over the other, for the color material usage reduction process of each object. The screen 630 is displayed on the operation unit 150, and a set value is stored, and referred to in the color material usage reduction process. There are eleven setting points on a setting bar 631. A process coefficient is determined based on a setting point where a pointer 632 is placed. The location of each setting point corresponds to weights of the density reduction process and the size decrease process. The leftmost setting point indicates that the size is not changed, and only the density reduction process is performed for color material usage reduction. The rightmost setting point indicates that the density is not changed, and only the size reduction process is performed for color material usage reduction. The weights of the two processes are, for example, represented by the following numerical values: 0.5:0.5 if the setting point is located at the middle; 1:0 if the setting point is located at the leftmost point, i.e., only the density reduction process is performed; and 0.9:0.1 if the setting point is located right next to the leftmost point. In the description that follows, the weight of the density reduction process is represented by "a," and the weight of the size decrease process is represented by "b," and the ratio of the two weights is represented by a:b (a+b=1).

FIGS. 11A and 11B are diagrams for describing a coefficient range within which settings for the density reduction process and the size decrease process can be specified. FIG. 11A indicates a predetermined limit value of the reduced density and a predetermined limit value of the size decrease ratio for each object attribute. For example, when the attribute is character, the limit is set to Dtxt % with respect to the original density, and the limit is set to Stxt % with respect to the original size. Similarly, for the attribute which is graphics, the limit values are represented by Dgph and Sgph. For the attribute which is image, the limit values are represented by Dimg and Simg. For the other attributes, the limit values are represented by Detc and Setc. FIG. 11B shows example numerical values which are specifically used as these limit values.

When the ratio of the weights of the density reduction process and the size decrease process set on the toner saving process balance setting screen 630 is a:b (a+b=1), the reduced density and size decrease ratio of each object are calculated as follows.

Figure 12:
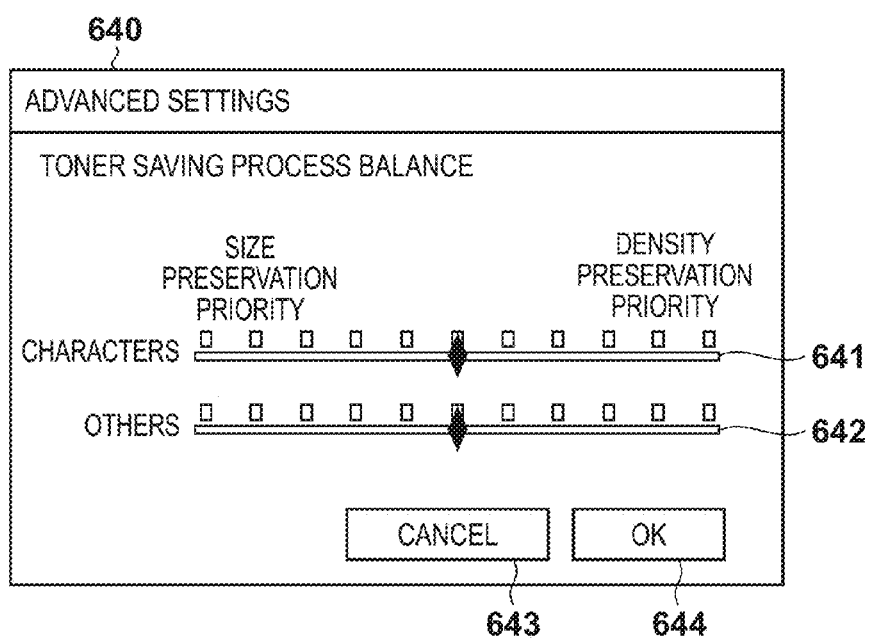
FIG. 12 is a diagram showing an operation screen for setting weights of processing schemes.

For objects whose attribute is character, reduced density (%)=Dtxt+(100−Dtxt)×a size decrease ratio (%)=Stxt+(100−Stxt)×b For objects whose attribute is graphics, reduced density (%)=Dgph+(100−Dgph)×a size decrease ratio (%)=Sgph+(100−Sgph)×b For objects whose attribute is image, reduced density (%)=Dimg+(100−Dimg)×a size decrease ratio (%)=Simg+(100−Simg)×b For objects whose attributes are other values, reduced density (%)=Detc+(100−Detc)×a size decrease ratio (%)=Setc+(100−Setc)×b The maximum values of the reduced density and the size decrease ratio may both be 100%, and values exceeding 100% may be replaced with 100%. The numbers a and b are used as weights for dividing the rate of addition to the minimum reduced density and the minimum size decrease ratio. Although, in the foregoing, the ratio of the weights of the density reduction process and the size decrease process is a:b irrespective of the object attribute, different ratios may be set for different object attributes (i.e., object types). FIG. 12 shows a toner saving process balance setting screen 640 for allowing the user to operate the settings. The toner saving process balance setting screen 640 is displayed on the operation unit 150. Ratios set on a setting bar 641 are applied to objects whose attribute is character. Ratios set on a setting bar 642 are applied to objects whose attribute is other than character. Although, here, the two setting bars are provided for the sake of simplicity of operation, a setting bar may be provided for each of the object attributes. When the ratio of the weights of the density reduction process and the size decrease process which is set in the setting bar 641 is a1:b1 (a1+b1=1), and the ratio of the weights of the density reduction process and the size decrease process which is set in the setting bar 642 is a2:b2 (a2+b2=1), the reduced density and size decrease ratio of each object are calculated as follows.

For objects whose attribute is character, reduced density (%)=Dtxt+(100−Dtxt)×a1 size decrease ratio (%)=Stxt+(100−Stxt)×b1

For objects whose attribute is graphics, reduced density (%)=Dgph+(100−Dgph)×a2 size decrease ratio (%)=Sgph+(100−Sgph)×b2

For objects whose attribute is image, reduced density (%)=Dimg+(100−Dimg)×a2 size decrease ratio (%)=Simg+(100−Simg)×b2

For objects whose attributes are other values, reduced density (%)=Detc+(100−Detc)×a2 size decrease ratio (%)=Setc+(100−Setc)×b2

Also as in the above example, the upper limits of the reduced density and the size decrease ratio may be set to 100%. The reduced density and size decrease ratio thus obtained are applied to each object type. Therefore, in this embodiment, the density reduction process and the size decrease process are applied to an object to be processed irrespective of the type, and the ratio of the weights which depends on the object type is used.

Thus, the color material usage reduction process which allows the user to change the balance between the density reduction process and the size decrease process is achieved, whereby the process can be suitably adjusted, depending on the intended use of an output document or the user's preference.

[Fourth Embodiment]

In the first to third embodiments, the numerical values of the reduced density and the size decrease ratio which are coefficients in the color material usage reduction process are previously determined. However, the acceptable ranges of the reduced density and the size decrease ratio may vary depending on the intended use or the user's preference. Therefore, if the user is allowed to adjust a coefficient which determines a feature of a processed image, the convenience is further improved. In this embodiment, a method for setting the acceptable ranges of the reduced density and the size decrease ratio, of the coefficients involved in the color material usage reduction process, using a simple operation, will be described. Although, here, two coefficients, i.e., the reduced density and the size decrease ratio, are described as an example for the sake of convenience, coefficients which are actually set are not limited to these coefficients.

Figure 13:
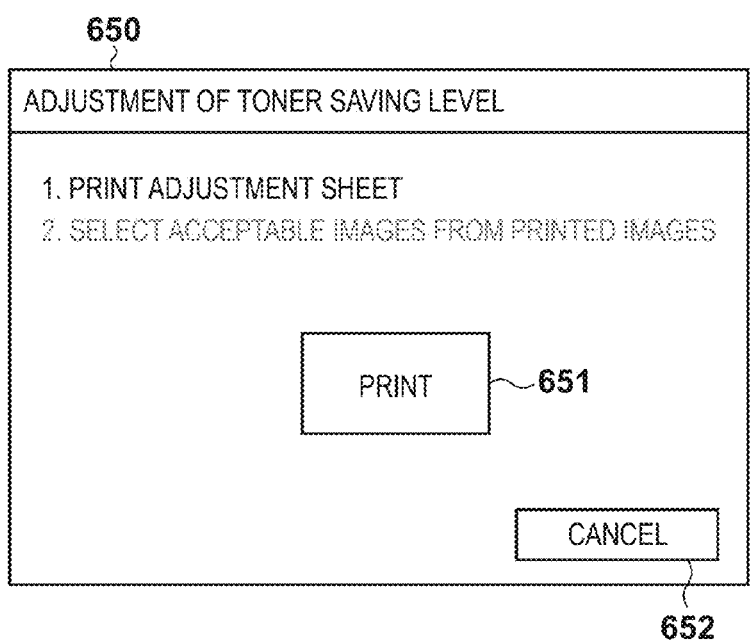
FIG. 13 is a diagram showing a level adjustment operation screen.

FIG. 13 shows an initial operation screen 650 which is used when the user adjusts the process level or acceptable range of the color material usage reduction process. The operation screen 650 is displayed on the operation unit 150. By the user pressing down a print button 651, a series of processes is started.

Figure 14:
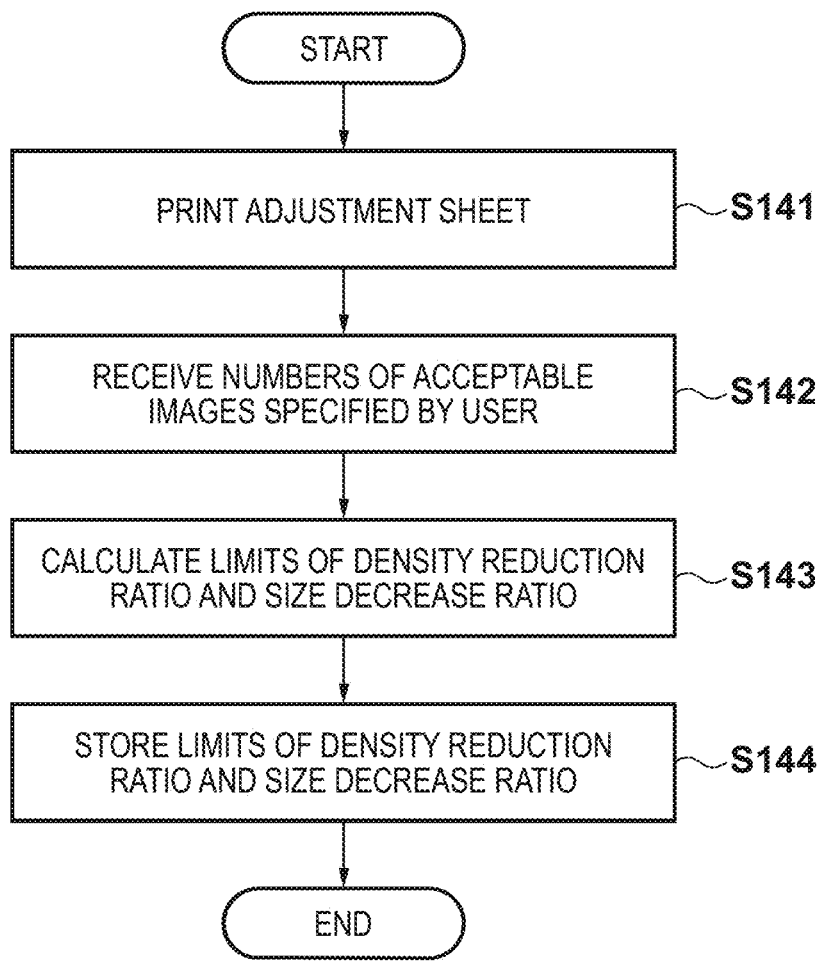
FIG. 14 is a flowchart showing a process of a fourth embodiment.

FIG. 14 is a flowchart showing a process flow for setting the acceptable ranges of the reduced density and the size decrease ratio. When the operation unit 150 notifies the system control unit 120 that the print button 651 has been pressed down, the system control unit 120 instructs the storage unit 130 to output an adjustment sheet image stored in the storage unit 130, and the printing unit 170 prints and outputs an adjustment sheet, in step S141. Thereafter, the process waits until the user has input an acceptable level using the user interface of FIG. 16.

Figure 15:
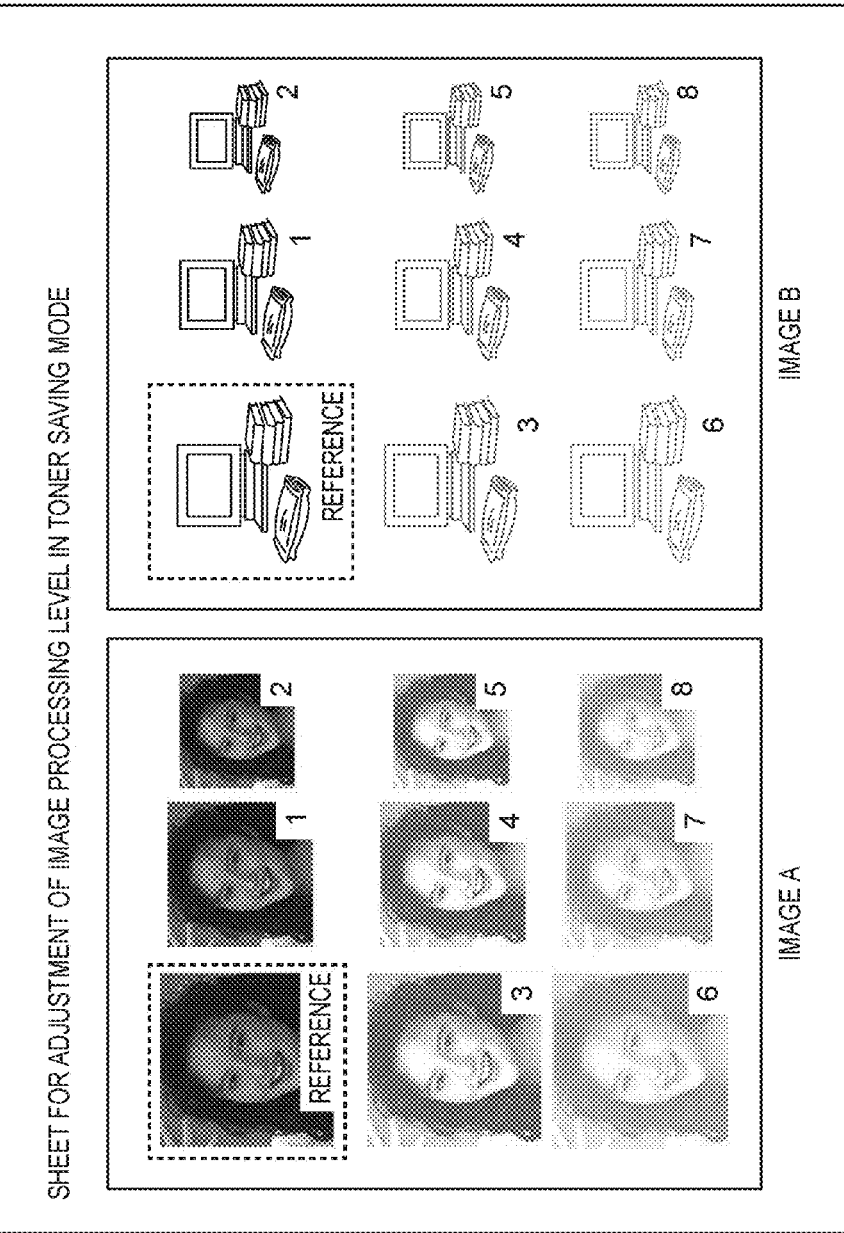
FIG. 15 is a diagram showing images on an adjustment sheet.

FIG. 15 shows an example adjustment sheet which is output. In this example, an "IMAGE A" region which is a representative of the attribute which is image, and an "IMAGE B" region which is a representative of the attribute which is graphics, are provided. In each of the "IMAGE A" region and the "IMAGE B" region, a reference image before the color material usage reduction process, and images obtained by performing the density reduction process and the size decrease process on the reference image, are arranged. In each of the "IMAGE A" region and the "IMAGE B" region, arranged are the reference image, an image 1 obtained by decreasing the size of the reference image by one level, an image 2 obtained by decreasing the size of the reference image by two levels, an image 3 obtained by reducing the density of the reference image by one level, an image 4 obtained by decreasing the size of the image 3 by one level, . . . , and an image 8 obtained by decreasing the size and density of the reference image by two levels. In other words, in this example, there are three reduced densities including 100%, and there are three size decrease ratios including 100%. A total of nine sample images having combinations of reduced densities and size decrease ratios which are gradually changed, are printed. An image whose reduced density and size decrease ratio are both 100% is the reference image. Note that, here, the size decrease ratio of 100% means no size decrease. Note that the applied process schemes and the number of levels of the process coefficients are not limited to this. The user selects an image which is acceptable as color material usage reduction print by observing the printed or output adjustment sheet.

FIG. 16 shows an operation screen 660 for allowing the user to input the result of selection of an acceptable image. The operation screen 660 is displayed on the operation unit 150. The numbers added to the processed images on the adjustment sheet are associated with a group of image selection buttons 661 or 662 on the operation screen 660. The user presses down a button(s) corresponding to an acceptable image on the adjustment sheet. For example, for the image A, if it is assumed that the processed images 1, 2, and 3 are acceptable, the buttons 1, 2, and 3 of the selection button group 661 are pressed down. Similarly, for the image B, if it is assumed that the processed images 1, 2, 3, 4, 6, and 7 are acceptable, buttons having the corresponding numbers of the selection button group 662 are pressed down. Thereafter, when an OK button 664 is pressed down, information about the selected acceptable images is sent to the system control unit 120.

If the information indicating acceptable images has thus been input, the system control unit 120 receives information of the acceptable images in step S142. In step S143, from the acceptable image information received from the system control unit 120, coefficients are determined, such as 70% as the limit of the reduced density and 60% as the limit of the size decrease ratio, of the attribute which is image, and 40% as the limit of the reduced density and 60% as the limit of the size decrease ratio, of the attribute which is graphics, etc. The system control unit 120 stores the coefficients thus determined which are the limit values of the reduced density and the size decrease ratio into the storage unit 130 in step S144.

The limit values of the reduced density and the size decrease ratio stored in the storage unit 130 may, for example, be used as the limit values in the third embodiment. Also, a target value may be provided for the reduction ratio of the color material usage, which is not herein described in detail, and based on the reduction ratio, optimum coefficients used in the density reduction process and the size decrease process may be calculated.

Here, the reduced density and size decrease ratio corresponding to one of the acceptable images that can reduce the color material usage, i.e., can save the color material, to the greatescharacterent, is selected. For example, in FIG. 16, for the image A, it is considered that the image 2 or 3 of the acceptable images has the lowest color material usage, and therefore, the color material usages of the images 2 and 3 are predicted, and the reduced density and size decrease ratio of the image having the lower color material usage are stored as those of an object whose attribute is image. For the image B, the image 2 or 7 has the lowest color material usage, and therefore, the color material usages of these images are estimated, and the reduced density and size decrease ratio of the image having the lower color material usage are stored as those of an object whose attribute is graphics. In this embodiment, the stored reduced density and size decrease ratio have been accepted by the user, and therefore, may be used to perform the density reduction process and the size decrease process, respectively. Also, for character, the density may be reduced by a predetermined factor, or the color material usage reduction process may not be performed thereon.

As described above, according to this embodiment, the user can view output images which are to be treated by the color material usage reduction process, and specify a reduced density and size decrease ratio which have acceptable levels of quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257395, filed Dec. 12, 2013, which is hereby incorporated by reference herein in its entirety.

What is claimed is:

1. An image processing apparatus to which a color material saving process can be applied, the image processing apparatus comprising:
   an object analysis unit which determines object type for an object contained in print data;
   an object conversion unit which, if the color material saving process is applied and the object analysis unit determines that the print data contains an image object, decreases the size of the image object contained in the print data, and if the color material saving process is applied and the object analysis unit determines that the print data contains a character object or a graphic object, reduces the density of the character object or the graphic object contained in the print data; and
   a priority level specifying unit which specifies a priority level of the size or the density, wherein the object conversion unit reduces the density and decreases the size according to a weight which is based on the specified priority level.

2. The image processing apparatus according to claim 1, wherein the priority level specifying unit further specifies the priority level, depending on the type of an object.

3. An image processing method performed by an image processing apparatus to which a color material saving process can be applied, the method comprising:
   determining object type for an object contained in print data;
   specifying a priority level of size or density;
   if the color material saving process is applied and it is determined that an image object is contained in the print data, decreasing the size of the image object contained in the print data by the image processing apparatus, and if the color material saving process is applied and it is determined that a character object or a graphic object is contained in the print data, reducing the density of the character object or the graphic object contained in the print data by the image processing apparatus; and
   printing the print data,
   wherein the density is reduced and the size is decreased according to a weight which is based on the specified priority level.

4. A non-transitory computer readable medium storing therein a program for causing a computer to execute an image processing method to which a color material saving process can be applied, the method comprising:
   determining object type for an object contained in print data;
   specifying a priority level of size or density; and
   if the color material saving process is applied and it is determined that an image object is contained in the print data, decreasing the size of the image object contained in the print data, and if the color material saving process is applied and it is determined that a character object or a graphic object is contained in the print data, reducing the density of the character object or the graphic object contained in the print data,
   wherein the density is reduced and the size is decreased according to a weight which is based on the specified priority level.

5. The image processing apparatus according to claim 1, wherein the object conversion unit reduces the density and decreases the size according to a corresponding one of a density reduction ratio and a size decrease ratio which are weighted based on the specified priority level.

6. The image processing apparatus according to claim 5, further comprising:
   a unit which outputs an adjustment sheet on which an image containing objects is formed, the objects having been reduced in their densities and decreased in their sizes using a combination of gradually changed values of the density reduction ratio and the size decrease ratio; and
   a receiving unit which receives a designation of an acceptable object or objects designated by a user form the objects formed on the adjustment sheet,
   wherein the density reduction ratio and the size decrease ratio which has been applied to the acceptable object designated by the user are used as a density reduction ratio and a size decrease ratio which are specified for each type of the object.

\* \* \* \* \*